United States Patent
Kneuper et al.

(10) Patent No.: US 9,685,090 B2
(45) Date of Patent: Jun. 20, 2017

(54) NAVIGATIONAL AIDS

(71) Applicant: Cessna Aircraft Company, Wichita, KS (US)

(72) Inventors: Jeremy Joseph Kneuper, Hesston, KS (US); John Robert Lanier, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 52 days.

(21) Appl. No.: 14/643,492

(22) Filed: Mar. 10, 2015

(65) Prior Publication Data

US 2016/0027312 A1 Jan. 28, 2016

Related U.S. Application Data

(63) Continuation-in-part of application No. 14/642,256, filed on Mar. 9, 2015.
(Continued)

(51) Int. Cl.
*G08G 5/00* (2006.01)
*G08G 5/02* (2006.01)
(Continued)

(52) U.S. Cl.
CPC ......... *G08G 5/0047* (2013.01); *G01C 23/005* (2013.01); *G06F 3/0481* (2013.01);
(Continued)

(58) Field of Classification Search
CPC .... G01C 23/00; G06F 3/0416; G08G 5/0004; G08G 5/0008; G08G 5/0021;
(Continued)

(56) References Cited

U.S. PATENT DOCUMENTS 5,181,027 A 1/1993 Shafer
5,272,652 A 12/1993 Rosenshein et al.
(Continued)

FOREIGN PATENT DOCUMENTS

EP 2623935 A1 7/2013

OTHER PUBLICATIONS

International Search Report and Written Opinion issued in PCT/US2015/019437, Jun. 18, 2015, 14 pages.
(Continued)

*Primary Examiner* — Khoi Tran
*Assistant Examiner* — Robert Nguyen
(74) *Attorney, Agent, or Firm* — Erise IP, P.A.

(57) ABSTRACT

Systems, methods and computer-storage media are provided for use of navigational aids. Three-dimensional graphical representations of flight plans, flight paths, waypoints, etc., may be displayed to improve situational awareness. Additionally, dynamic monitoring of airports, waypoints, traffic, etc., may be performed so that real-time updates are available to users. The real-time updates will not only include updated location information and any relevant navigational markers (e.g., updated waypoints, new traffic, etc.) but will also include detailed information related to the navigational markers such as a distance from the marker, an airspeed of the marker (if applicable), and the like.

19 Claims, 13 Drawing Sheets

Related U.S. Application Data

(60) Provisional application No. 61/951,189, filed on Mar. 11, 2014, provisional application No. 61/951,260, filed on Mar. 11, 2014, provisional application No. 61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,145, filed on Mar. 11, 2014.

(51) Int. Cl.
*G01C 23/00* (2006.01)
*G06F 3/0481* (2013.01)
*G06F 3/0484* (2013.01)

(52) U.S. Cl.
CPC ...... *G06F 3/04817* (2013.01); *G06F 3/04847* (2013.01); *G08G 5/0004* (2013.01); *G08G 5/0008* (2013.01); *G08G 5/0021* (2013.01); *G08G 5/0052* (2013.01); *G08G 5/0078* (2013.01); *G08G 5/025* (2013.01)

(58) Field of Classification Search
CPC .. G08G 5/0047; G08G 5/0052; G08G 5/0078; G08G 5/025
USPC ........................................................ 701/120
See application file for complete search history.

(56) References Cited

U.S. PATENT DOCUMENTS

| | | | |
|---|---|---|---|
| 7,382,288 B1* | 6/2008 | Wilson | G01C 23/00 340/961 |
| 7,576,695 B2 | 8/2009 | Smith et al. | |
| 7,808,377 B2 | 10/2010 | Shafaat et al. | |
| 8,032,267 B1 | 10/2011 | Simon | |
| 8,380,366 B1 | 2/2013 | Schulte et al. | |
| 8,552,889 B2 | 10/2013 | Lutz et al. | |
| 8,666,649 B2 | 3/2014 | Otto et al. | |
| 9,478,140 B2* | 10/2016 | Kathirvel | G08G 5/0043 |
| 2001/0035832 A1 | 11/2001 | Block | |
| 2003/0156046 A1 | 8/2003 | Dwyer | |
| 2004/0140959 A1 | 7/2004 | Matsumura et al. | |
| 2004/0236481 A1 | 11/2004 | Saint-Aroman et al. | |
| 2006/0238402 A1* | 10/2006 | Khatwa | G01C 23/005 342/29 |
| 2009/0112380 A1 | 4/2009 | Nutaro et al. | |
| 2009/0326744 A1* | 12/2009 | He | G01C 23/00 701/10 |
| 2010/0070110 A1 | 3/2010 | Badli et al. | |
| 2010/0141482 A1 | 6/2010 | Wyatt et al. | |
| 2010/0194602 A1 | 8/2010 | Engels et al. | |
| 2010/0211237 A1* | 8/2010 | Nichols | G01C 23/00 701/14 |
| 2010/0231418 A1 | 9/2010 | Whitlow et al. | |
| 2010/0250030 A1* | 9/2010 | Nichols | G01C 23/005 701/7 |
| 2010/0265268 A1* | 10/2010 | Wilson | G08G 5/0021 345/619 |
| 2010/0283635 A1* | 11/2010 | Brinkman | G01C 23/00 340/961 |
| 2011/0025530 A1* | 2/2011 | He | G01C 23/005 340/972 |
| 2011/0066362 A1* | 3/2011 | He | G08G 5/0008 701/120 |
| 2011/0193694 A1 | 8/2011 | Bowden et al. | |
| 2011/0196598 A1* | 8/2011 | Feyereisen | G01C 21/00 701/120 |
| 2011/0241901 A1 | 10/2011 | Firra | |
| 2011/0313597 A1* | 12/2011 | Wilson | G01C 23/00 701/3 |
| 2012/0026190 A1 | 2/2012 | He et al. | |
| 2012/0215433 A1* | 8/2012 | Subbu | G06Q 10/047 701/120 |
| 2013/0006511 A1* | 1/2013 | Ramaiah | G08G 5/0004 701/120 |
| 2013/0027226 A1 | 1/2013 | Cabos | |
| 2013/0076540 A1 | 3/2013 | McLoughlin et al. | |
| 2013/0162632 A1 | 6/2013 | Varga et al. | |
| 2013/0245860 A1 | 9/2013 | Cooper | |
| 2014/0285661 A1* | 9/2014 | Feyereisen | G08B 13/196 348/148 |
| 2014/0300508 A1* | 10/2014 | Booher | G01S 7/04 342/176 |
| 2014/0309821 A1* | 10/2014 | Poux | G08G 5/0021 701/14 |
| 2014/0335797 A1* | 11/2014 | Cooper | H04W 8/005 455/67.13 |
| 2015/0015698 A1* | 1/2015 | Knight | G08G 5/045 348/115 |
| 2015/0262545 A1 | 9/2015 | Kneuper et al. | |
| 2015/0352952 A1 | 12/2015 | Kneuper et al. | |
| 2016/0049080 A1* | 2/2016 | Bazawada | G08G 5/0013 701/120 |

OTHER PUBLICATIONS

U.S. Appl. No. 14/643,510, Office Action dated Feb. 18, 2016, 24 pages.

\* cited by examiner

NAVIGATIONAL AIDS

CROSS REFERENCE TO RELATED APPLICATIONS

This application is a continuation-in-part of U.S. patent application Ser. No. 14/642,256, entitled "Touch Screen Instrument Panel", filed Mar. 9, 2015, which claims the benefit of each of U.S. Provisional Application No. 61/951,145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951,231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", all filed Mar. 11, 2014. The entireties of each of the aforementioned applications are incorporated by reference herein.

BACKGROUND

Navigational aids, such as Traffic Collision Avoidance Systems (TCAS), radars, global positioning systems (GPS), transponders, charts, etc. have been used in aircraft for years. Existing navigational aids, however, are generalized and provide minimal amounts of information. Some situations require users to reference multiple existing systems in order to acquire the information needed. Thus, limited, general information from multiple sources is the available navigational option.

SUMMARY

This summary is provided to introduce a selection of concepts in a simplified form that are further described below in the Detailed Description. This summary is not intended to identify key factors or essential features of the claimed subject matter, nor is it intended to be used as an aid in determining the scope of the claimed subject matter.

In various embodiments, systems, methods, and computer-readable storage media are provided for providing navigational aids. Various navigational aids may be combined in the present invention, eliminating the need to reference numerous sources. Additionally, detailed information may be provided to a user via a touch-screen instrument panel (TSIP). The navigational aids of the present invention will improve situational awareness.

In an embodiment, a method for providing navigational aids is provided. The method recites receiving an indication of a flight path that includes one or more waypoints, wherein a waypoint is a coordinate in physical space; generating a graphical representation of the flight path, wherein the graphical representation includes a plurality of planes (path indicators) along the flight path, wherein each plane is associated with a slope and an angle for an orientation of a vehicle navigating the flight path; and dynamically updating the graphical representation relative to an updated location of the vehicle.

In another embodiment, a method for providing navigational aids is provided. The method includes identifying one or more airports proximate to a location of an aircraft, wherein proximate is within a predefined distance from the aircraft; identifying information associated with the one or more airports including, at least, an airport identifier and a distance from the aircraft; generating an airport icon for each of the one or more airports; providing the airport icon for each of the one or more airports, wherein the airport icon for each of the one or more airports is provided in a three-dimensional real-time image; and updating the one or more airports and airport icons based on an updated location of the aircraft.

In yet another embodiment, one or more computer-storage media having embodied thereon computer-usable instructions that, when executed, facilitate a method for providing navigational aids is provided. The claim recites identifying a location of a first aircraft; identifying any traffic within a predetermined distance of the first aircraft, wherein traffic includes other aircraft; determining that a second aircraft is within the predetermined distance of the first aircraft; generating a traffic user interface panel that includes information associated with the second aircraft including an airspeed of the second aircraft, wherein the traffic user interface panel is provided via a touch-screen instrument panel overlaying a real-time image; and monitoring the predetermined distance from the first aircraft and updating according to an updating location of the first aircraft.

Further embodiments and aspects will become apparent by reference to the drawings and by study of the following detailed description.

BRIEF DESCRIPTION OF THE DRAWINGS

Illustrative embodiments of the present invention are described in detail below with reference to the attached figures, which are incorporated by reference herein and wherein.

DETAILED DESCRIPTION

Embodiments of the present invention provide navigational aids in a cockpit of an aircraft. Additional embodiments of the present invention provide navigational aids in any type of vehicle.

Figure 1:
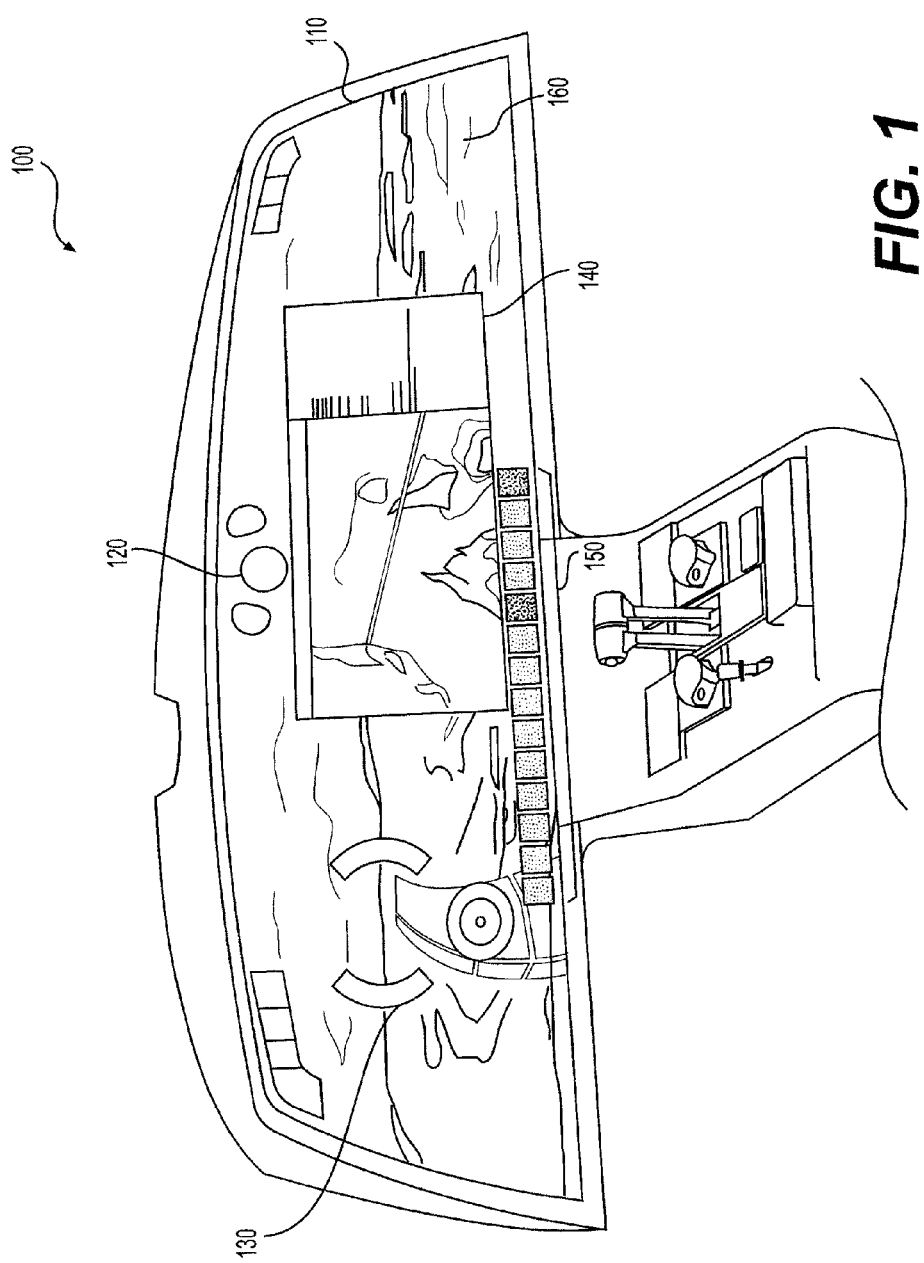
FIG. 1 depicts a perspective view of an embodiment of a touch-screen instrument panel system for an aircraft, in accordance with an embodiment of the present invention.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer becomes transparent so that the flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users has easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather user interface panel. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
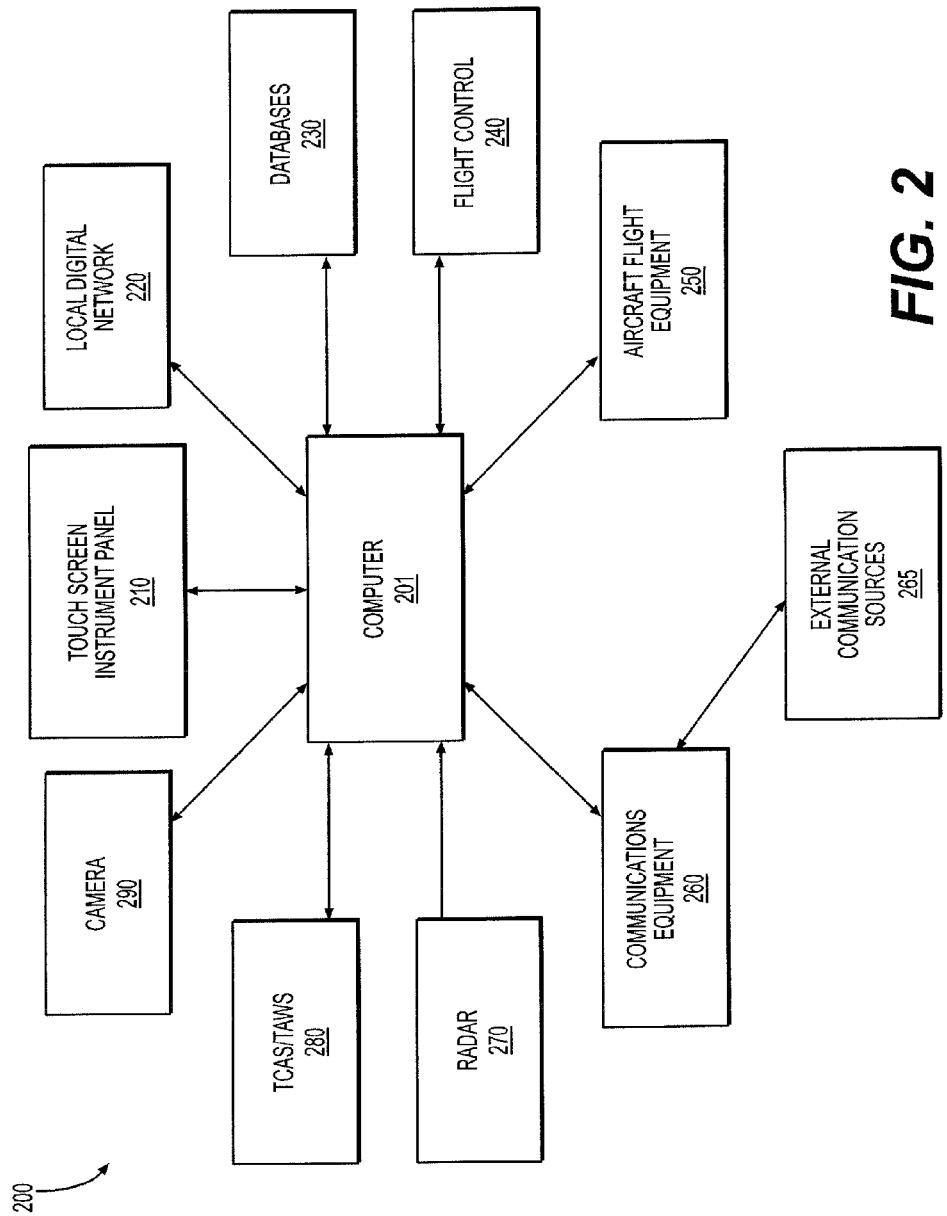
FIG. 2 depicts a system diagram for an embodiment of a touch-screen instrument panel system for an aircraft, in accordance with an embodiment of the present invention.

FIG. 2 provides an embodiment of a system environment 200 including an aircraft touch-screen instrument panel (TSIP) 210. System environment 200 has a network of subsystems that includes an on-board computer 201, the TSIP itself 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processor provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as corners. In an embodiment, substrate has a large aspect ratio for providing images. Display is for example an organic light-emitting diode (OLED) display, which is thin and flexible for layering onto substrate. When unpowered, display is, in embodiments, transparent. Touch membrane is a thin, transparent and flexible material that is layered onto display and capable of sensing touch. Touch membrane is for example a resistive, capacitive, optical, or infrared touchscreen. Together, touch membrane and display provide TSIP 210 with a visual display that a user may control by touching with one or more fingers or a stylus.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, deicing equipment, lights, and sensors (e.g., temperature, pressure, electrical). Aircraft flight equipment 250 is monitored and controlled by pilots using TSIP 210 through computer 201 for flying aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about other aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible light as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the condition of the aircraft, meaning that the user interface components provide an intuitive, broad view of the aircraft, its various components and subsystems, and their condition. The user interface utilizes the touch screen functionality of the TSIP 210 to present views of the aircraft to intuitively communicate information and accept input from the pilot. The views of the aircraft incorporate graphical, textual, and numerical elements to simultaneously convey multiple pieces of information to the pilot. The graphical, textual, and numerical elements of the user interface may flash, change color, change content, appear, disappear, move or change location, or otherwise change in response to user input or the state of the aircraft systems.

The computer 201 monitors the aircraft's data busses to determine the positions, temperatures, pressures, and states of various equipment and systems of the aircraft. The TSIP graphically displays the data gleaned from the busses in the appropriate synoptic panels or windows for flight crew interaction. The inventive user interface provides a thorough, easily understood, intuitive and user-friendly interaction with each synoptic user interface. The touch screen functionality of TSIP 210 also allows the user to activate aircraft systems and change configuration settings through user interface displayed on TSIP 210.

The user interface may provide for a variety of user interface elements grouped into a variety of "windows", which may also be referred to as "panels" or "pages." Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on TSIP 210.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration. Active controls may be updated automatically by the system to display the current aircraft configuration, but are also capable of interacting with the user via TSIP 210 to receive pilot input.

As previously mentioned, the present invention is directed to providing navigational aids. Navigational aids have been used in aircraft to assist users in navigation and to improve situational awareness. However, the aids are typically separate components and sometimes multiple sources need to be referenced to gain access to necessary information. Additionally, the displays of previous navigational aid systems were limited and not able to display detailed information related to the navigational aid. For example, the previous displays were typically very small so including detailed information was not feasible since there was no room on the screen to display the information.

A navigational aid, as used herein, refers generally to a tool utilized to aid in the navigation of a vehicle whether it is the physical navigation of the vehicle, additional information aiding in the physical navigation of the vehicle, or the like. A vehicle may be any mode of transportation including, but not limited to, aircraft, watercrafts, etc. In preferred embodiments, the present invention is implemented within an aircraft. While navigational aids currently exist that help "guide" a vehicle, or aircraft in embodiments, that is the extent of the aid. A mere "guide" showing where the aircraft is traveling is provided. The present invention offers integration of multiple informational sources as well as detailed navigational information.

The navigational aids of the present invention may be displayed via the TSIP 210. Additionally, the use of a camera, such as camera 290, may facilitate the capture of the real-time image displayed on the TSIP 210. The navigations aids described herein may be displayed on the TSIP 210 overlaying the real-time image. In embodiments, navigational aids are displayed overlaying a three-dimensional real-time panoramic view. The navigational aids may include, for instance, a flight guide, an airport guide, and a traffic guide, to name a few. Any other application that aids in the navigation of a vehicle (e.g., aircraft) may be included in the navigational aids displayed via TSIP 210.

Initially, a flight guide navigational aid will be discussed. The flight guide may be displayed overlaying the three-dimensional real-time image of the TSIP 210. The flight guide itself may be displayed in a three-dimensional representation. The flight guide, with the use of a plurality of planes, or path indicators, creates a graphical representation of a flight plan and/or flight path. Flight plan, as used herein, refers generally to a planned path identified at the onset of the flight an aircraft should follow to arrive at a destination. A flight path, as used herein, refers generally to an actual path of an aircraft. The flight path may or may not be the same as the flight plan. User configurations may determine whether a flight plan or flight path is displayed. Alternatively, a setting could be selected that provides both the flight plan and the flight path such that a user is able to quickly view if there are any differences between the current flight plan and the planned flight plan.

The flight guide may interact with various systems of an aircraft including, but not limited to, aircraft avionics, autopilot and flight plan systems to determine location, speed, altitude, attitude, and the like, to display the appropriate flight track the aircraft will/should follow. The information necessary to the flight guide application may be acquired from the ARINC Data Bus of any avionics manufacturer system. In embodiments, the flight guide application may be a stand-alone component in communication with the avionics manufacturer's system. In additional embodiments, the flight guide application may be incorporated into an avionics manufacturer's system.

Figure 3:
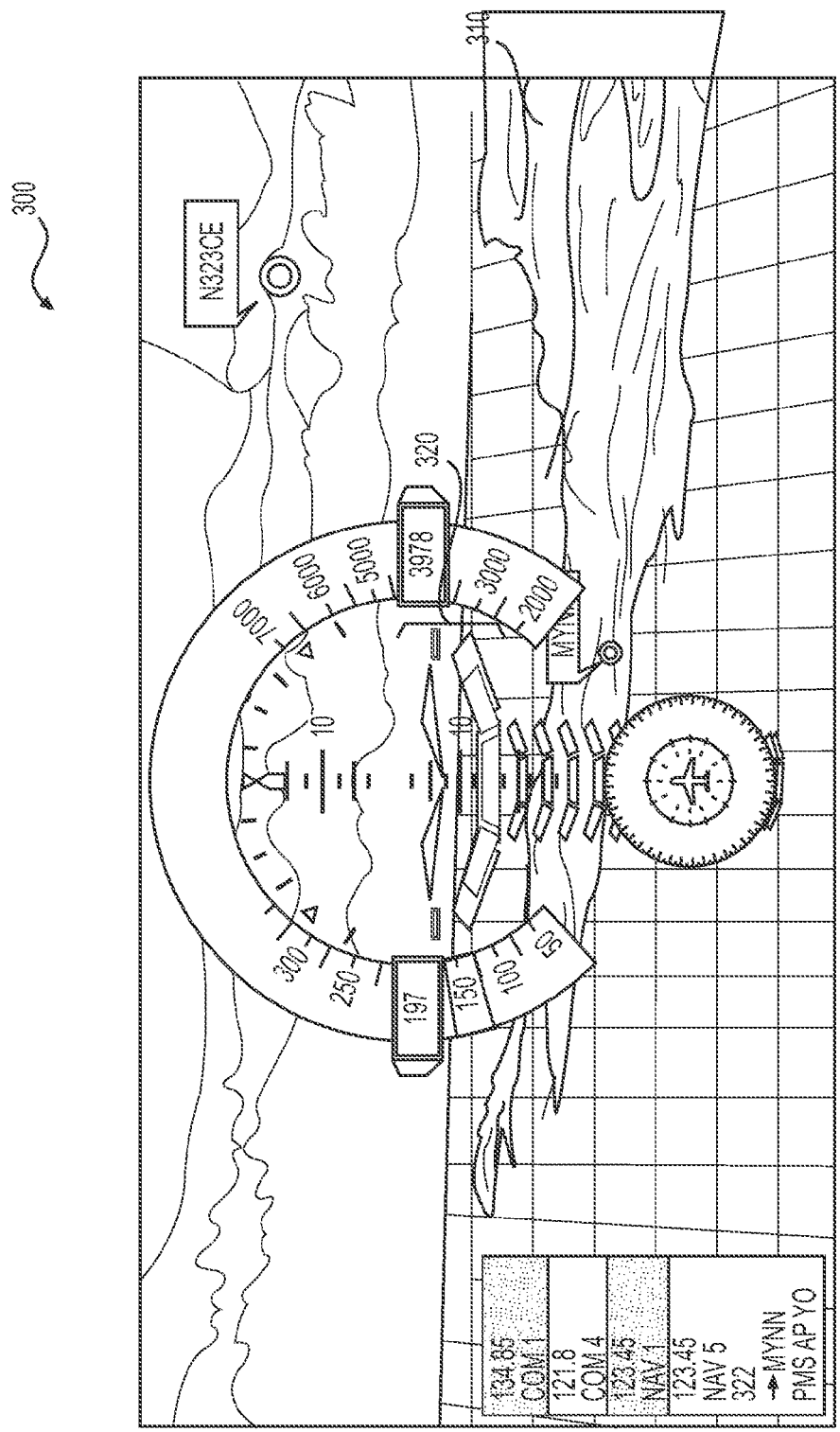
FIG. 3 depicts an exemplary graphical user interface (GUI) in which a navigational aid is displayed, in accordance with an embodiment of the present invention.

FIG. 3 provides an exemplary graphical user interface (GUI) 300 illustrating a flight guide application. A real-time image 310 is provided via the TSIP 210 and the flight guide application is provided such that it is overlaying the real-time image 310. The flight guide application is embodied in GUI 300 as a flight path 320 comprising a plurality of planes, or path indicators. The plurality of planes/path indicators may be used to highlight the flight path 320 of an aircraft. The plurality of planes may each be associated with various coordinates (e.g., physical locations in space), glide slopes, and the like. In an embodiment, the information associated with each plane/path indicator (e.g., glide slope, etc.) is displayed to a user upon an indication such as selection of the plane, hovering over the plane/path indicator, etc.

Figure 4:
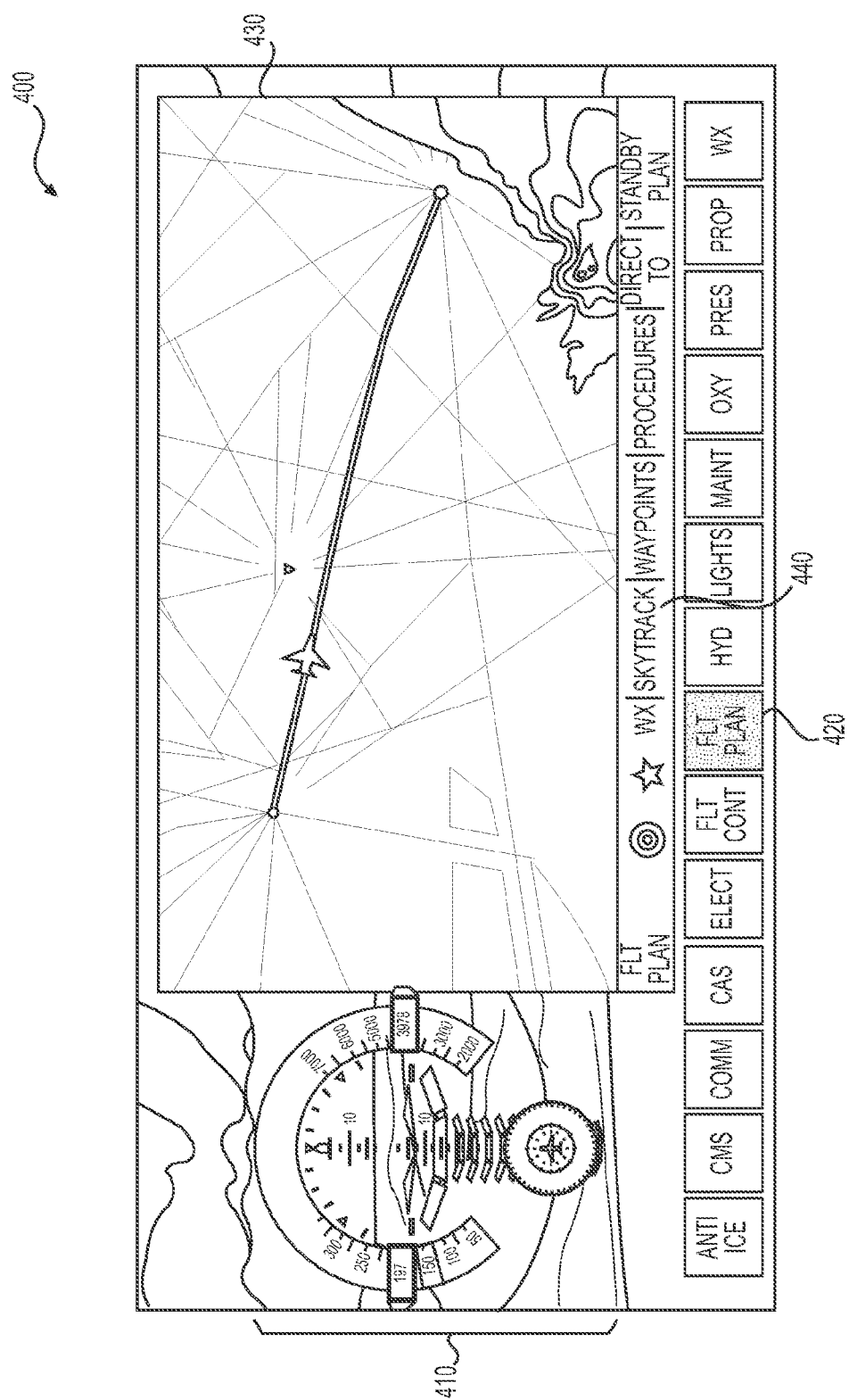
FIG. 4 depicts an exemplary graphical user interface in which a user interface panel is displayed with a navigational aid, in accordance with an embodiment of the present invention.

The flight guide application may be a feature that is controlled directly from the TSIP 210. FIG. 4 provides an exemplary GUI 400 illustrating the selection features of the flight guide application. The flight guide 410 may be displayed in combination with a menu including a flight guide activation icon 420 and a user interface panel 430 including flight path details. The flight guide activation icon 420 may be configured such that selection thereof provides a detailed flight plan user interface panel 430. The user interface panel 430 may include the flight plan from origin to destination, weather, a current flight path to destination, and the like. Within the user interface panel 430 a flight guide activation icon 440 may be included that is configured such that selection thereof activates (i.e., turns on) or deactivates (i.e., turns off) the flight guide application. If deactivated, the flight guide 410 may no longer be presented on the TSIP 210. Upon reactivation, the flight guide 410 may reappear via the GUI 400. This allows users the ability to dynamically control activation of the flight guide 410.

Figure 5:
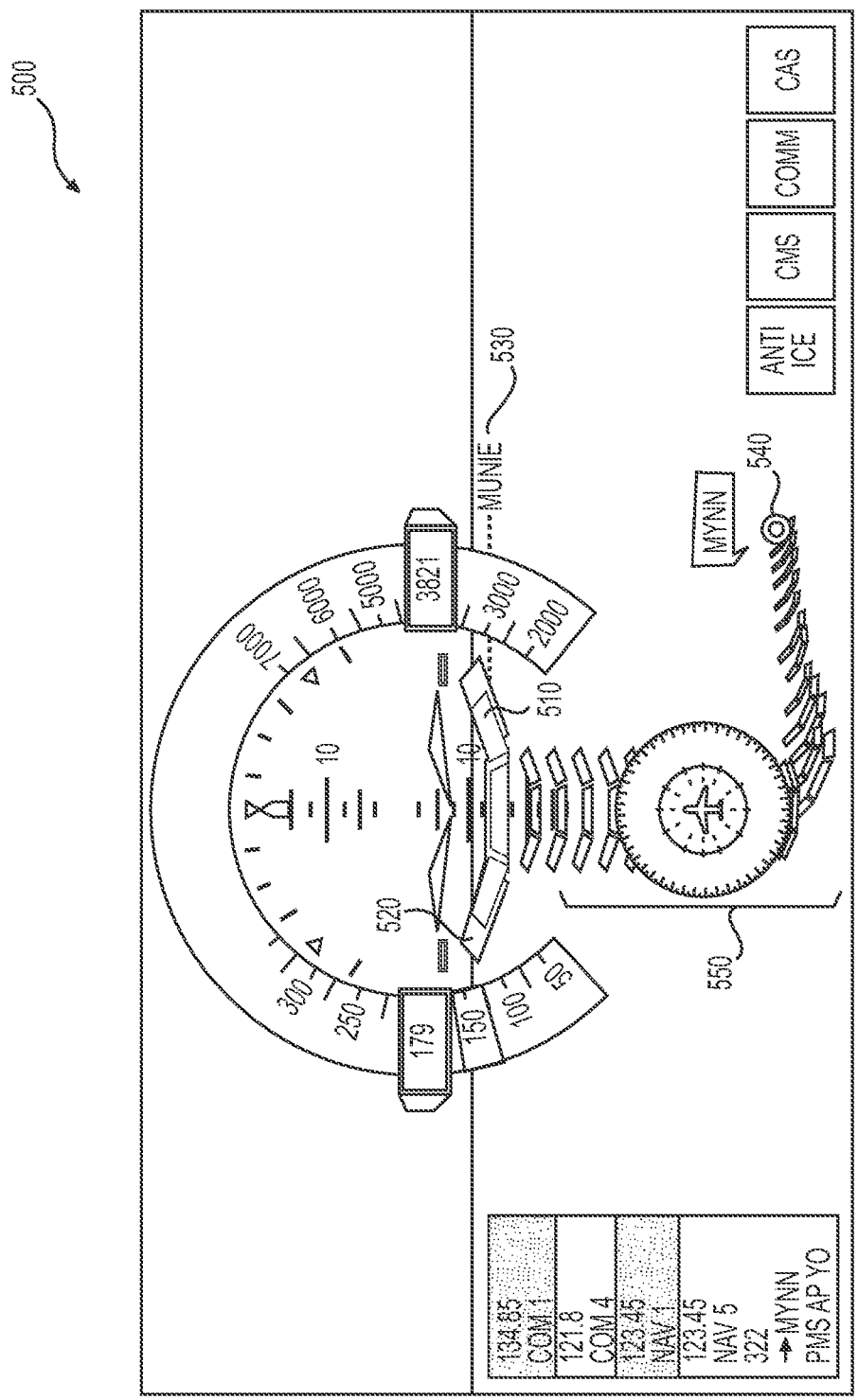
FIG. 5 depicts an exemplary graphical user interface in which a navigational aid is displayed with one or more markers, in accordance with an embodiment of the present invention.

Turning now to FIG. 5, an exemplary GUI 500 is provided that illustrates a flight guide 550. As previously mentioned, the flight guide 550 illustrates a flight path including one or more path indicators to provide a graphical representation of the flight path. The one or more path indicators may each be associated with spatial coordinates. For instance, a first path indicator 510 is associated with different spatial coordinates than a second path indicator 520. Additionally, each of the path indicators may be represented in a different manner as the vehicle is approaching a path indicator. For example, the representation may be based on distance such that a first path indicator within X distance may be represented one way (e.g., a specific color, a visual representation, etc.) while a second path indicator within Y distance (further than X distance) may be represented another way, different from the first path indicator (e.g., a specific color different than that used for the first path indicator, a visual representation different from that used for the first path indicator, etc.). Alternatively, path indicators may be displayed the same way when they are each greater than a predetermined distance from the aircraft. This may be helpful so that only path indicators that are proximate (within a predetermined distance from an aircraft) are displayed differently and attract attention while the remaining path indicators that are not proximate indicate the flight path without distinguishing representations.

A plurality of path indicators is provided in FIG. 5 and may be seen as a first path indicator 510 and a second path indicator 520. As is shown, first path indicator 510 is on top of, or before, second path indicator 520 in the flight guide 550. This alerts users that the first path indicator 510 and coordinates associated therewith will be encountered prior to the second path indicator 520 and its respective coordinates.

The flight guide 550 may include one or more waypoints. A waypoint, as used herein, refers generally to coordinate in physical space. FIG. 5 provides a first waypoint 530 and a second waypoint 540. By of example, a waypoint may be a destination airport, radio beacon, or VOR (VHF Omni-Directional Radio) stations along the flight guide, etc. The flight guide 550 may be configured so that path indicators are associated with waypoints. In embodiments, path indicators are displayed differently when approaching a waypoint. For example, when an aircraft is proximate to a waypoint (i.e., within a predetermined distance from a waypoint), the path indicators leading to the waypoint may be displayed differently to signal an approach. The path indicators may, for example, flash when the aircraft is approaching the path indicator. The path indicators may, alternatively, change colors to signal a relative distance from the aircraft, the waypoint, etc. The information necessary to integrate the flight guide, waypoints, etc., may be acquired from any aircraft system previously mentioned that typically supplies the data (e.g., GPS, charts, etc.).

Figure 6:
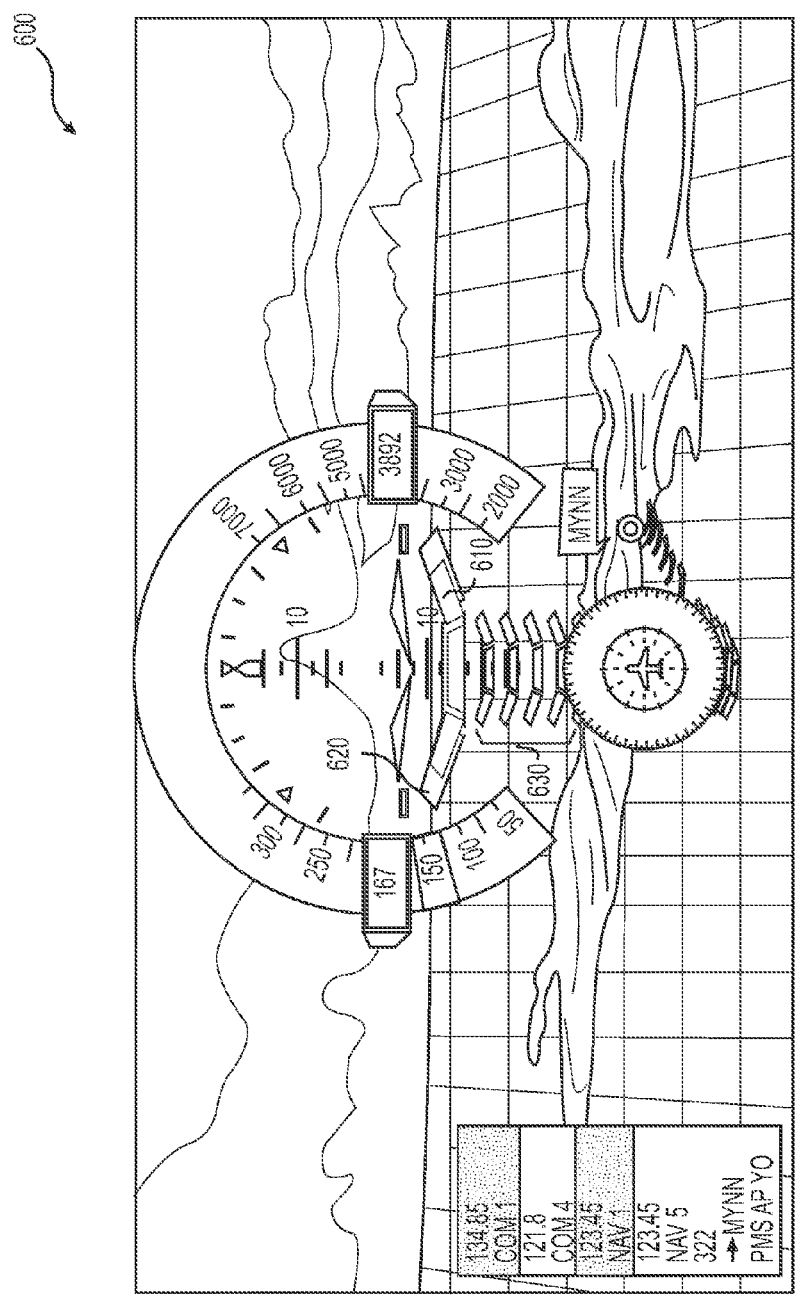
FIG. 6 depicts an exemplary graphical user interface in which a navigational aid is displayed with one or more markers, in accordance with an embodiment of the present invention.

This example is further described with respect to FIG. 6. FIG. 6 provides an exemplary GUI 600 that is a front-view of a flight guide 630 including one or more path indicators, a first path indicator 610 and a second path indicator 620. As with FIG. 5, the first path indicator 610 and second path indicator 620 are arranged such that the path of the aircraft is apparent to one or more users.

Figure 7:
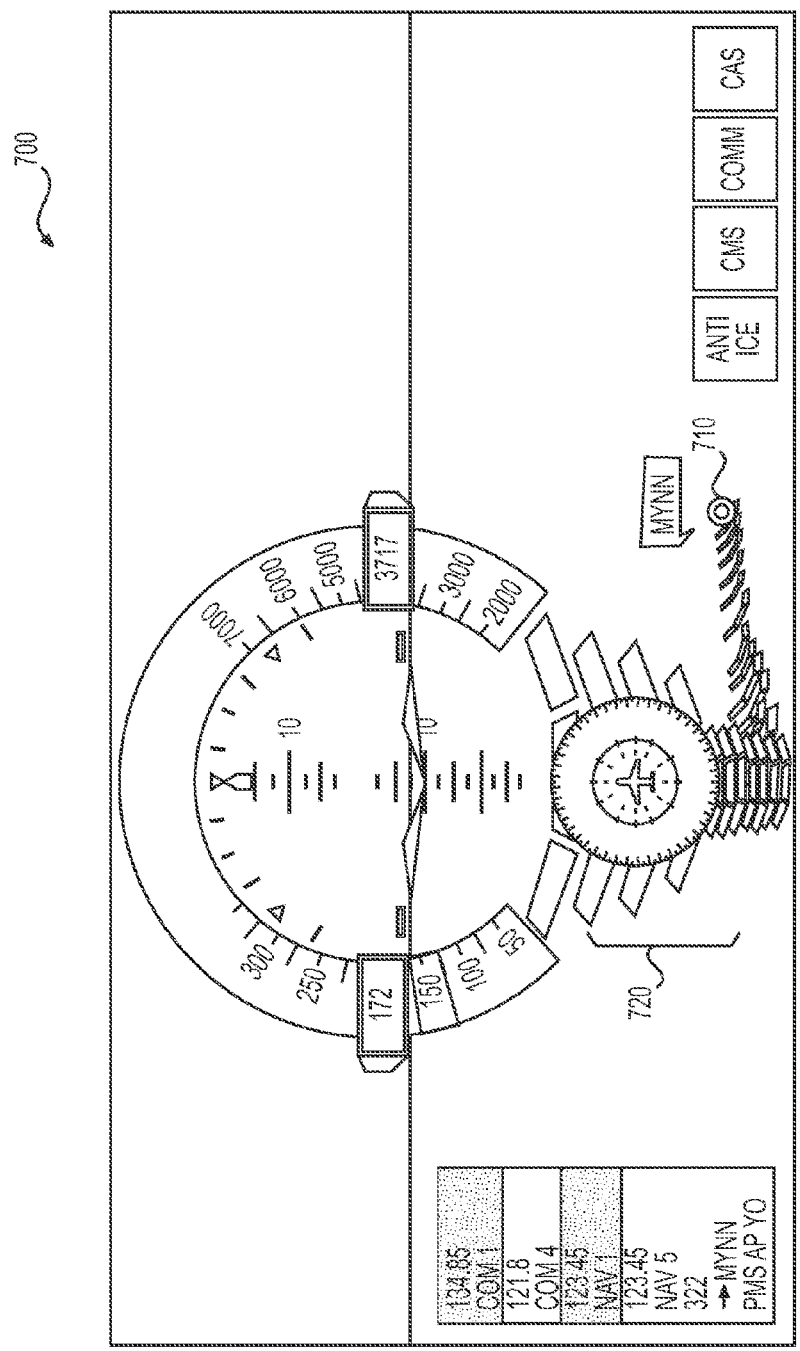
FIG. 7 depicts an exemplary graphical user interface in which a navigational aid is displayed with one or more markers, in accordance with an embodiment of the present invention.

FIG. 7 provides an exemplary GUI 700 of an exemplary descent screen. As in FIG. 5, a flight guide 720 is provided with one or more path indicators illustrated. The concept described with reference to FIG. 5 is applicable in this example as well but is directed to a descent, specifically. As previously described, the one or more path indicators may be configured to convey information based on a distance to or from a waypoint, the aircraft, or the like. In a descent situation, the one or more path indicators proximate to the destination will indicate a descent is approaching and may be proximate to a waypoint 710 (e.g., destination airport). Similar to previous examples, this may be illustrated by displaying the path indicators differently to draw attention to them by, for example, using different colors, flashing the path indicators, etc. It is noted that the flight guides provided in FIGS. 3-7 are overlaying a three-dimensional real-time image on the TSIP.

Figure 8:
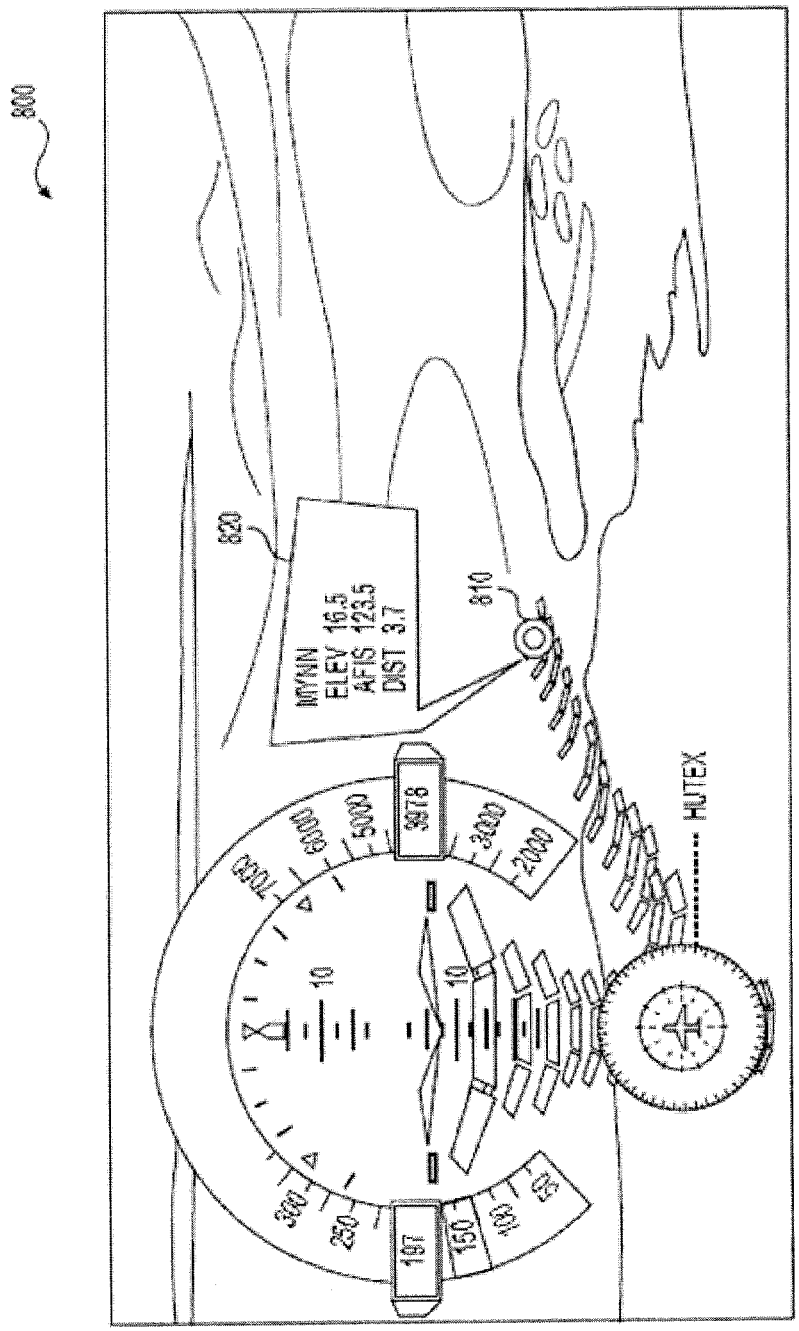
FIG. 8 depicts an exemplary graphical user interface in which detailed airport information is displayed, in accordance with an embodiment of the present invention.

One or more airports, as previously described, may be provided in a flight guide as a waypoint, a destination, an origin, or the like. When navigating, it may be useful to have access to airport information associated with said airports, whether it is the destination airport or not, for a variety of reasons. FIG. 8 provides an exemplary GUI 800 illustrating an embodiment where detailed information regarding an airport is provided. As with the previous GUI's described, FIG. 8 depicts a flight guide overlaying a real-time image. FIG. 8 provides a destination airport indicator 810 along with a user interface panel 820. The destination airport indicator 810 may be configured such that selection thereof results in the display of the user interface panel 820. A selection may be hovering over the indicator 820, touching the indicator 820 with a finger, a stylus, or any other input device, or any other method used for selection of an item on a touch-screen interface. The user interface panel 820 may include detailed information associated with the indicator 810. In this case, the destination airport indicator 810 is associated with a destination airport so information related to the particular destination is provided such as, for example, the airport code of the airport, an elevation, a distance of the destination airport from the aircraft, a frequency with which to contact the airport, and the like. Any information may be provided in the user interface panel 820 as determined by a user.

Airports may be presented within the TSIP when it is determined they are within a predetermined distance from the aircraft. The predetermined distance may be any distance desired by a user and is configurable such that it may be dynamically changed. An exemplary predetermined distance is 150 nautical miles. A current location of the aircraft may be continuously monitored such that the predetermined distance evaluated is constantly changing. For instance 150 nautical miles from the aircraft at Point A is different when the aircraft travels 5 miles east to Point B. Thus, the TSIP may be in constant communication with other aircraft systems to provide updated, real-time data including a current location of the aircraft and any updates to airport information based on changes in the aircraft's current location.

Figure 9:
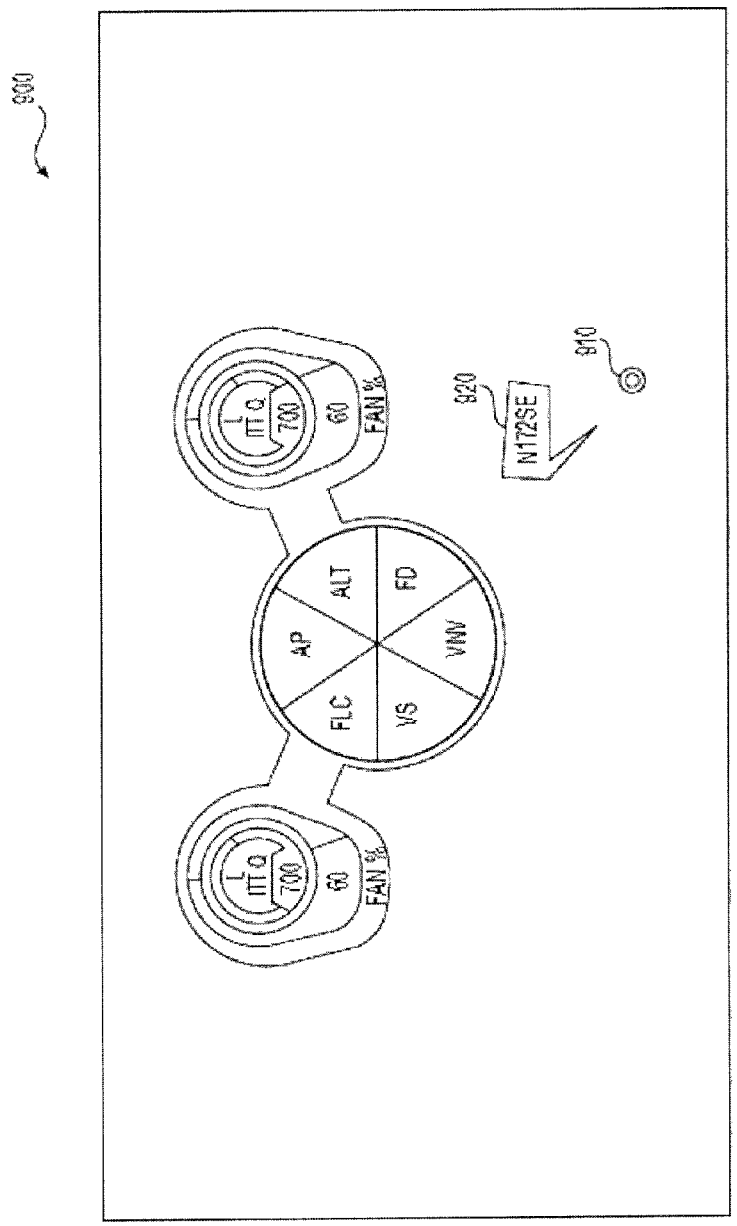
FIG. 9 depicts an exemplary graphical user interface in which traffic information is displayed, in accordance with an embodiment of the present invention.

As with airports, there may be situations where detailed information related to traffic may be needed. Traffic, as used herein, refers generally to any vehicle proximate to, or within a predetermined distance of, the aircraft. FIG. 9 provides an exemplary GUI 900 illustrating a traffic embodiment of the present invention. FIG. 9 illustrates this embodiment where traffic is indicated with a flight instrument display (similar to flight instrument display 120 of FIG. 1) but traffic could be displayed in any part of the TSIP. Here, an item of traffic is detected and represented as traffic icon 910. Traffic icon 910 may be associated with a traffic information panel 920. The traffic information panel 920 may include a tail number as a traffic identifier or any other identifying means to identify traffic associated with the traffic icon 910. In this case, a tail number of the aircraft associated with the traffic icon 910 is provided in the traffic information panel 920.

Figure 10:
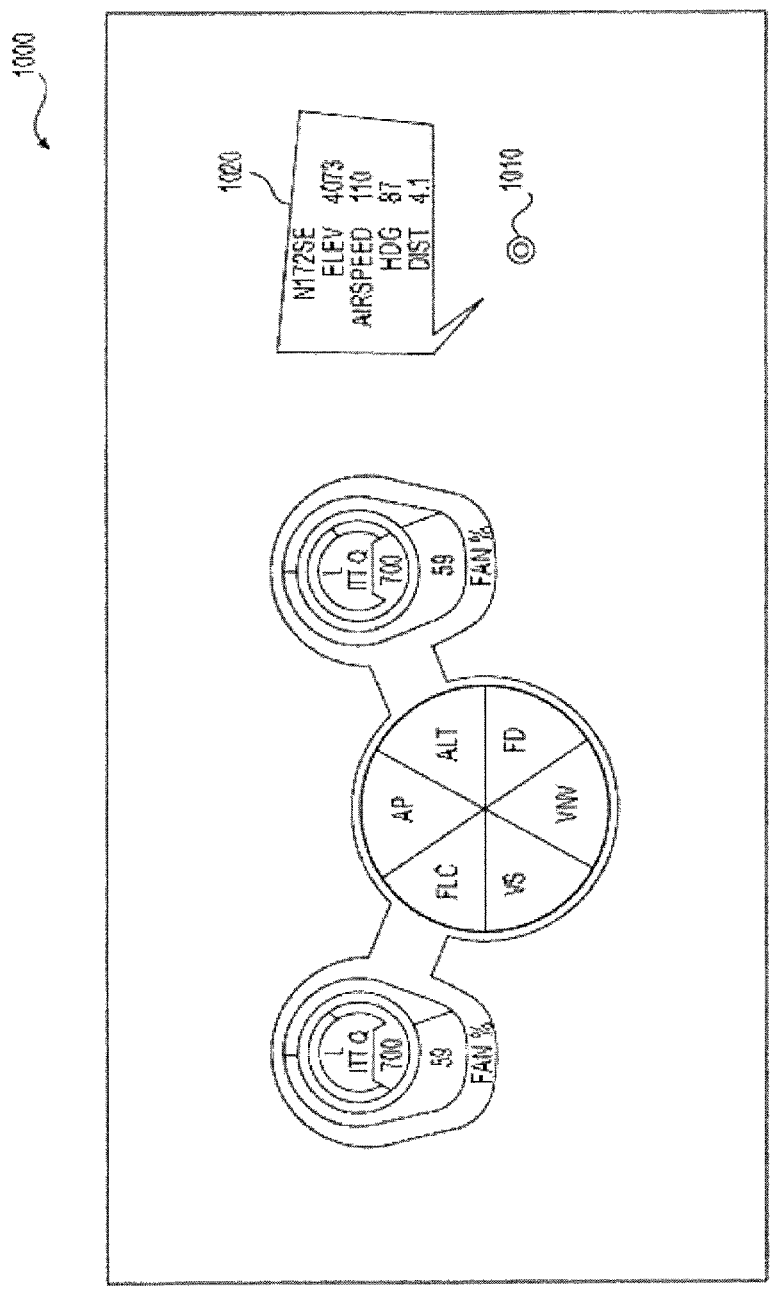
FIG. 10 depicts an exemplary graphical user interface in which detailed traffic information is displayed, in accordance with an embodiment of the present invention.

Traffic icon 910 may be configured such that selection thereof may result in a display of detailed traffic information. The detailed information may be provided in a detailed traffic panel as illustrated in FIG. 10. FIG. 10 provides an exemplary GUI 1000 illustrating a traffic icon 1010 and a detailed traffic panel 1020. The detailed traffic panel 1020 in this case provides a tail number as a traffic identifier or other identifying means (that may have been displayed in a traffic information panel similar to traffic information panel 920 of FIG. 9 prior to selection of the traffic icon 1010) as well as an elevation of the traffic associated with the traffic icon 1010, a distance away from the aircraft, a speed, and the like. Information displayed may be configured by users to achieve a customized interface.

The ability to make a selection of, for example, a traffic icon or a destination airport indicator allows users to obtain a real-time detailed view via the TSIP where users may have otherwise been required to reference several sources to compile information and still would not have the compilation viewable on a touch screen interface with a single selection. Each embodiment of this application (e.g., traffic and airport details, flight guides, etc.) may be provided overlaying a real-time image.

Additionally, with each of the airport and traffic embodiments, information may have been previously displayed such as a simple identifier but detailed information including distance, elevation, speed, etc. was not previously displayed.

Furthermore, with each of the airport and traffic embodiments, a current location of the aircraft is continuously monitored and updated (via, for example, GPS) such that the airport information, traffic information, waypoint information, etc. is accurate. For example, the flight guide discussed herein is configured to indicate a proximate waypoint. A current location of an aircraft is continuously monitored and updated so that it is known when a waypoint is within a predetermined distance of the aircraft. Similarly, a current location of an aircraft should be known at all times in order to ascertain traffic that is within a predetermined distance of the current location. This real-time monitoring provides up-to-date information. Furthermore, detailed information provided (e.g., detailed airport information, detailed traffic information) may include information that requires updating based on updates to a current location of an aircraft. For instance, in FIG. 10, a distance from the aircraft is provided as 4.1. As the aircraft moves, and as the traffic moves, this distance between the two changes and may be updated as updated locations and speeds are identified of both the aircraft and the traffic.

Traffic information may be provided to users based on distance levels. A distance level, as used herein, refers generally to distance ranges to organize data. Aircraft users (e.g., pilots, co-pilots) would like to be alerted to traffic but, in some cases, may not need an urgent alert. For example, traffic may be detected that is X distance away from aircraft, where X is a completely normal, safe distance. On the other hand, traffic may be detected that is Y distance from the aircraft, where Y is not necessarily a risk yet but is something that should be monitored or may require action. Lastly, there may situations where traffic is detected at Z distance, where Z is an emergent situation that is a risk and requires action to avoid danger. It makes sense to provide these varying levels of traffic notifications to a user in a different manner. Thus, distance levels may be utilized to organize traffic. Distance levels may be configured by a user and exemplary figures are only used herein for example purposes only. Assume that a predetermined distance from an aircraft to monitor is 100 nautical miles. A first distance level may be 50-75 nautical miles, while a second distance may be 25-50 nautical miles, and further more a third distance may be less than 25 nautical miles. Again, these distances are merely exemplary and may be configured and customized for each user's preferences. Additionally, the system may be configured to include as many distance levels as desired by users.

Thus, when traffic is detected within the first distance level, it may simply be displayed via the TSIP with some identifying information. Alternatively, traffic at other distance levels designated by a user to accompany a notification may be provided via the TSIP along with an alert. The alert may be a separate notification (e.g., a pop-up alert panel) or may be included in or with the traffic icon (e.g., an exclamation point on the traffic icon, the traffic icon appearing in an alert color (e.g., red), and the like). Additionally, the TSIP may be equipped with a master alert system that results in the TSIP (the entire TSIP) indicating an alert is present. In the example of nearby traffic, if an alert is warranted based on the distance level, the TSIP master alert system may initiate and generate an alert by, for example, making a border of the TSIP flash with an alert (e.g., the border may flash a color (red)), switch to an alert state (e.g., the border may switch to an alert color designated by a user), or the like.

Figure 11:
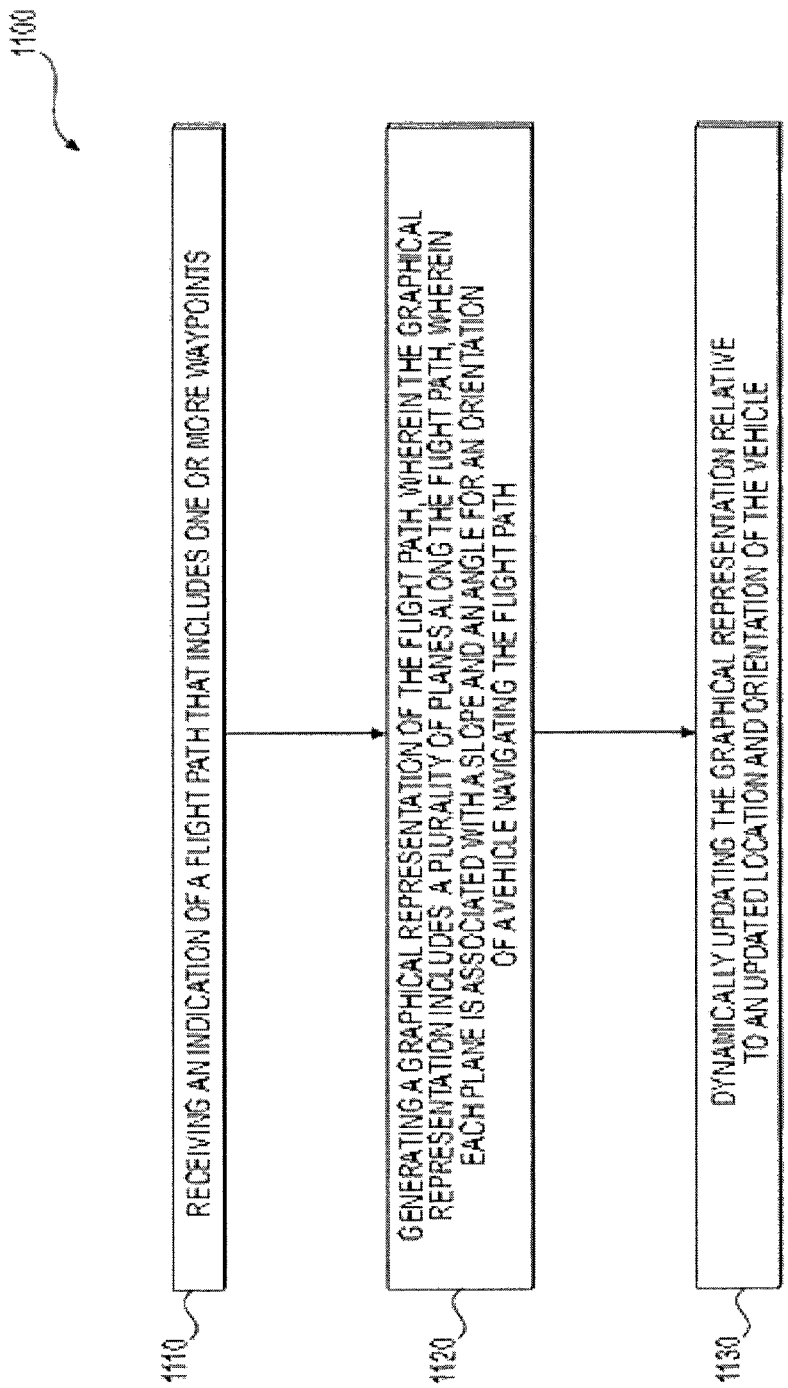
FIG. 11 is a flow diagram showing an exemplary method for providing navigational aids, in accordance with an embodiment of the present invention.

With reference to FIG. 11, a flow diagram is provided showing an exemplary method 1100 for providing navigational aids. Initially, at block 1110, an indication of a flight path that includes one or more waypoints is received. A graphical representation of the flight path is generated at block 1120. The graphical representation includes a plurality of planes (path indicators) along the flight path, wherein each plane is associated with a slope and an angle for an orientation of a vehicle navigating the flight path.

At block 1130 the graphical representation is dynamically updated relative to an updated location of the vehicle.

Figure 12:
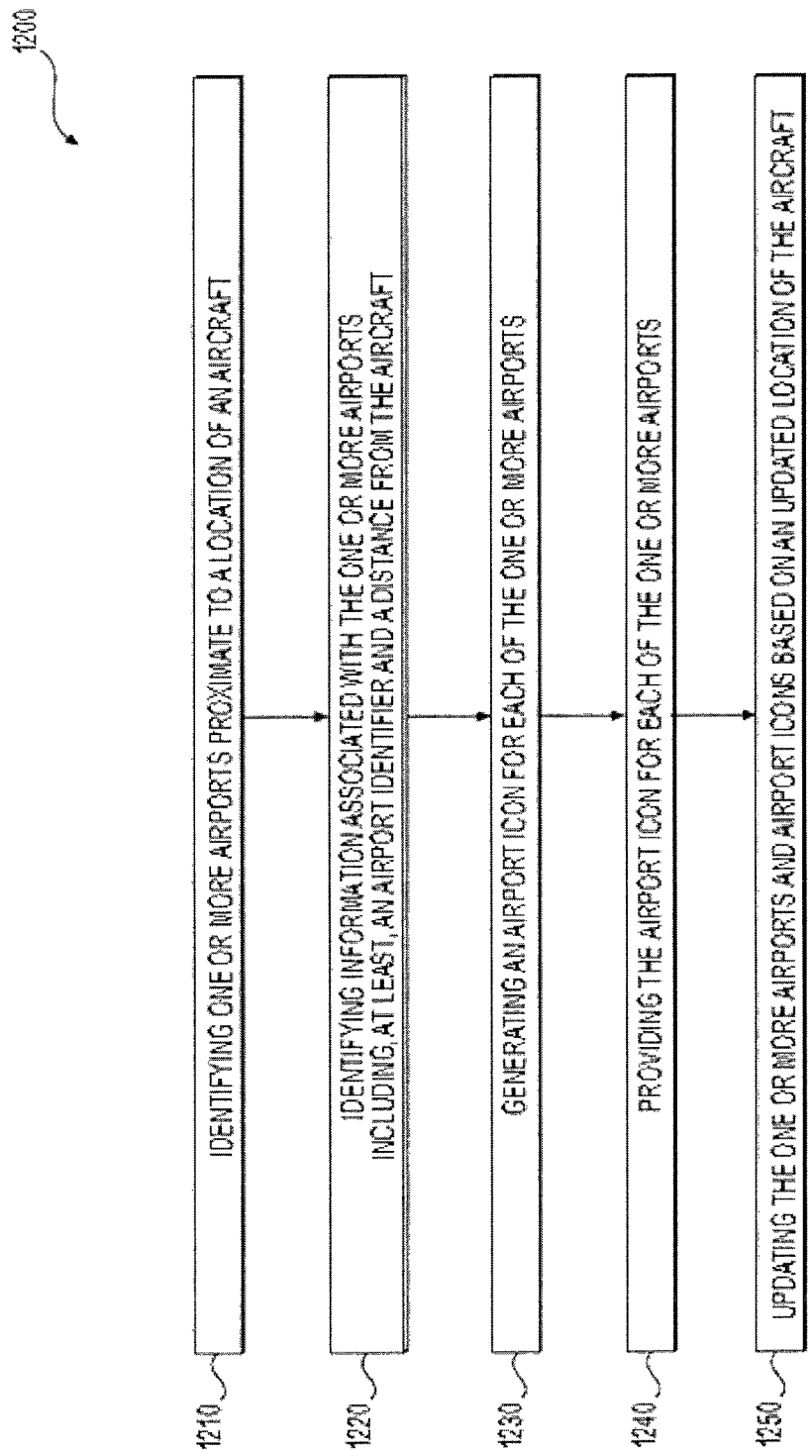
FIG. 12 is a flow diagram showing another exemplary method for providing navigational aids, in accordance with an embodiment of the present invention.

With reference to FIG. 12, a flow diagram is provided showing another exemplary method 1200 for providing navigational aids. Initially, at block 1210, one or more airports proximate to a location of an aircraft is identified. Information associated with the one or more airports is identified at block 1220 and includes, at least, an airport identifier and a distance from the aircraft. An airport icon is generated for each of the one or more airports at block 1230 and is provided at block 1240. At block 1250, the one or more airports and airport icons are updated based on an updated location of the aircraft.

Figure 13:
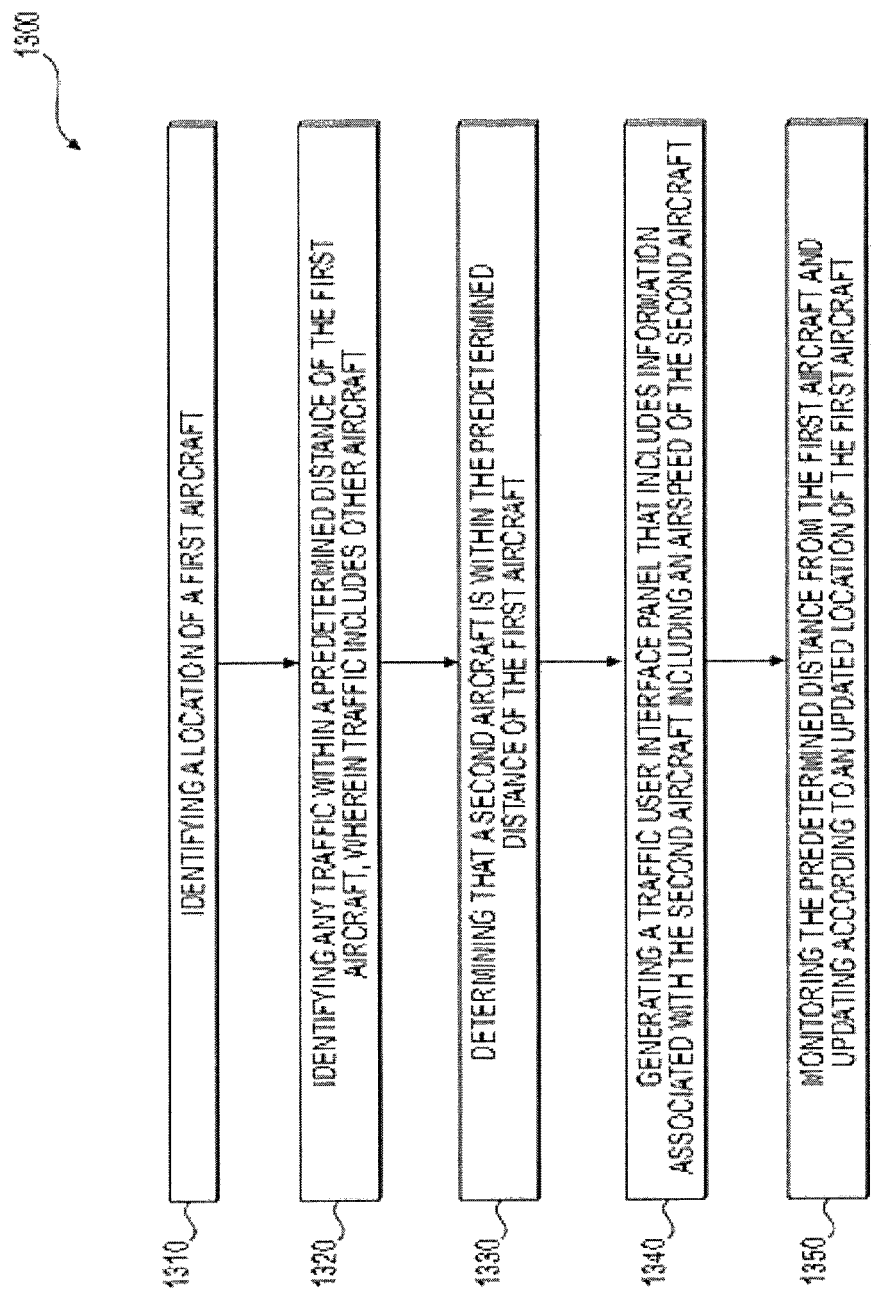
FIG. 13 is a flow diagram showing another exemplary method for providing navigational aids, in accordance with an embodiment of the present invention.

With reference to FIG. 13, a flow diagram is provided showing yet another exemplary method 1300 for providing navigational aids. Initially, at block 1310, a location of a first aircraft is identified. At block 1320, any traffic within a predetermined distance of the first aircraft is identified, wherein traffic includes other aircraft. It is then determined that a second aircraft is within the predetermined distance of the first aircraft at block 1330. A traffic user interface panel that includes information associated with the second aircraft including airspeed of the second aircraft is generated at block 1340. The predetermine distance from the first aircraft is monitored and updated according to an updated location of the first aircraft at block 1350.

Embodiments of the invention have been described to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed but, rather, the invention is to cover all modifications, alternative constructions, and equivalents falling within the spirit and scope of the invention.

It will be understood by those of ordinary skill in the art that the order of the steps recited herein is not meant to limit the scope of the present invention in any way and, in fact, the steps may occur in a variety of different sequences within embodiments hereof. Any and all such variations, and any combination thereof, are contemplated to be within the scope of embodiments of the present invention.

The invention claimed is:

1. A navigational method for a vehicle, the method comprising:
   receiving an indication of a flight path that includes one or more waypoints, wherein a waypoint is a coordinate in physical space;
   generating a graphical representation of the flight path overlaid upon a real-time image displayed on a touch-screen instrument panel in the vehicle, wherein the graphical representation includes a plurality of path indicators projecting the flight path towards at least one of the one or more waypoints, wherein each path indicator visually represents a slope and an angle for an orientation of the vehicle navigating the flight path; and
   dynamically updating the graphical representation relative to an updated location and orientation of the vehicle.

2. The method of claim 1, further comprising receiving an indication to initiate a navigational application that provides the graphical representation of the flight path.

3. The method of claim 1, wherein the flight path indicates a current path from an origin to a destination.

4. The method of claim 1, wherein each of the plurality of path indicators projects a glide slope of the flight path.

5. The method of claim 1, wherein a first path indicator is visually represented differently from a second path indicator to convey that the first path indicator is nearer the vehicle than the second path indicator.

6. The method of claim 5, wherein differences between path indicators is indicated by different colors such that the first path indicator is a first color and the second path indicator is a second color, different from the first color.

7. The method of claim 1, wherein the plurality of path indicators optionally flash.

8. A navigational method for an aircraft, the method comprising:
   identifying one or more airports proximate to a location of the aircraft, wherein proximate is within a predefined distance from the aircraft;
   identifying information associated with the one or more airports including, at least, an airport identifier and a distance from the aircraft;
   generating an airport icon for each of the one or more airports;
   overlaying the airport icon for each of the one or more airports, wherein the airport icon for each of the one or more airports is overlaid on a real-time image displayed on a touch-screen instrument panel located in the aircraft cockpit, wherein the real-time image is captured by a camera mounted to an exterior of the aircraft; and
   updating the one or more airports and airport icons based on an updated location of the aircraft.

9. The method of claim 8, wherein the information associated with the one or more airports further includes an elevation.

10. The method of claim 8, wherein the information associated with the one or more airports further includes an airport code and an airport frequency identifier.

11. The method of claim 8, wherein the predetermined distance is a distance in nautical miles.

12. The method of claim 8, wherein the airport icon for each of the one or more airports is displayed along a graphical representation of a flight plan overlaying the real-time image.

13. The method of claim 12, wherein the graphical representation of the flight plan further includes one or more waypoints, wherein a waypoint is a coordinate in physical space.

14. One or more non-transitory computer-storage media having embodied thereon computer-usable instructions that, when executed, facilitate a navigational method for an aircraft, the method comprising:
   identifying a location of a first aircraft;
   identifying any traffic within a first predetermined distance of the first aircraft, wherein traffic includes other aircraft;
   determining that a second aircraft is within the first predetermined distance of the first aircraft;
   generating a traffic user interface panel onboard the first aircraft that includes information associated with the second aircraft including an airspeed of the second aircraft, wherein the traffic user interface panel is provided via a touch-screen instrument panel overlaying a real-time image, wherein the real-time image is captured by a camera mounted to an exterior of the first aircraft; and monitoring any traffic within the first predetermined distance from the first aircraft and updating the traffic user interface panel according to an updated location of the first aircraft, wherein the first predetermined distance from the first aircraft includes one or more distance levels indicating closeness of traffic, wherein the levels include:

a first level including traffic that is within the first predetermined distance from the first aircraft but greater than a second predetermined distance from the first aircraft; and a second level including traffic that is within the second predetermined distance from the first aircraft but greater than a third predetermined distance from the first aircraft.

15. The media of claim 14, wherein the information associated with the second aircraft further includes a distance of the second aircraft from the first aircraft.

16. The media of claim 14, wherein the first predetermined distance is greater than the second predetermined distance and the second predetermined distance is greater than the third predetermined distance.

17. The media of claim 14, wherein an alert is generated when traffic is identified within the first predetermined distance from the first aircraft.

18. The media of claim 14, wherein the first predetermined distance is 100 nautical miles, the second predetermined distance is between 25- 50 nautical miles, and the third predetermined distance is less than 25 nautical miles.

19. One or more non-transitory computer-storage media having embodied thereon computer-usable instructions that, when executed, facilitate a navigational method for an aircraft, the method comprising:

identifying a location of a first aircraft;

identifying any traffic within a first predetermined distance of the first aircraft, wherein traffic includes other aircraft;

determining that a second aircraft is within the first predetermined distance of the first aircraft;

generating a traffic user interface panel onboard the first aircraft that includes information associated with the second aircraft including an airspeed of the second aircraft, wherein the traffic user interface panel is provided via a touch-screen instrument panel overlaying a real-time image, wherein the real-time image is captured by a camera mounted to an exterior of the first aircraft; and monitoring any traffic within the first predetermined distance from the first aircraft and updating the traffic user interface panel according to an updated location of the first aircraft.

* * * * *